United States Patent [19]

Goldberger

[11] 3,803,352

[45] Apr. 9, 1974

[54] VIDEO INFORMATION STORAGE AND RETRIEVAL SYSTEM

[75] Inventor: Arnold Goldberger, Great Neck, N.Y.

[73] Assignee: Video Fox Communications Corporation, Washington, D.C.

[22] Filed: July 17, 1972

[21] Appl. No.: 272,443

[52] U.S. Cl. .......................... 178/6.6 A, 178/6.6 A

[51] Int. Cl. .......................................... H04n 1/36

[58] Field of Search .................... 178/6.6 A, 6.6 DD

[56] References Cited

UNITED STATES PATENTS

| | | | |
|---|---|---|---|
| 2,824,904 | 2/1958 | Toulon | 178/6.6 A |
| 2,874,214 | 2/1959 | Anderson | 178/6.6 DD |
| 3,082,293 | 3/1963 | Johnson | 178/6.6 A |
| 3,526,900 | 9/1970 | McCoy | 178/6.6 D |
| 3,564,127 | 2/1971 | Sziklai | 178/6.6 D |

*Primary Examiner*—Terrell W. Fears

[57] ABSTRACT

A video system to store, retrieve and distribute printed and graphic information via standard T.V. recording and transmission equipment. Documents are converted by a high-resolution video camera into corresponding video signals. These signals are stored in a low-resolution magnetic tape apparatus for subsequent reproduction on a high-resolution video display tube.

The camera and display tubes are designed to function with a scan line number per frame that is a predetermined multiple of the standard T.V. low resolution line number and with a frame repetition rate that is a complementary sub-multiple of the standard rate.

To reconcile the low resolution storage apparatus with the high resolution camera and display tube, a buffer is provided to divided the high-resolution video signal from the camera into multiple signal sections. Each of these has a number of scan lines exactly equal to the standard scan number per frame within a time period equal to the full frame period of the standard frame repetition rate. The signal sections are recorded in sequence in the buffer or separate continuous tracks. In the storage mode, the signal sections which together represent a high-resolution frame, are transferred sequentially from the buffer onto the magnetic tape of the storage apparatus. In the playback mode, the recorded signal sections on the storage tape are returned back to the buffer and from there are fed to the display tube for visual presentation as a single high-resolution image.

15 Claims, 3 Drawing Figures

VIDEO INFORMATION STORAGE AND RETRIEVAL SYSTEM

BACKGROUND OF THE INVENTION

This invention relates generally to video information storage and retrieval systems, and more particularly to a hybrid system employing a high-resolution video camera for scanning the documents to be stored, a high-resolution display tube for reproducing retrieved documents and low-resolution tape recording devices operating at the standard scan line number and frame rate for storage, read-out and transmission purposes.

Two basic approaches have heretofore been taken in solving the problem of storing enormous quantities of documents in a manner whereby the information is concentrated in a compact bank from which it can readily be retrieved on demand.

The first approach is visual and involves a photographic technique wherein the documents are stored in a reduced scale in microfilm or microfiche form. Micro-records are primarily useful for library storage wherein the development of micro-images which cannot be erased is not objectionable. The visual approach does not lend itself to active day-by-day filing and retrieval, for one cannot update, purge or add to a previously photographed group of documents.

The second approach, which is the concern of the present invention, is electronic in nature and involves a video magnetic tape recording technique for the storage of graphic information. This information may be in the form of printed, typed or hand-written documents, maps, charts or any other type of data. The commercial potential of video recording for the storage of document images has been recognized for many years. As noted by Becker and Hayes in their 1963 text "Information Storage and Retrieval" (John Wiley & Sons Inc.), magnetic tape represents an almost ideal, high-density storage medium, for it is the basic storage medium for virtually every major computer, it provides the efficient storage and high-speed transfer rate desired, and it is erasable so that stored data may be changed.

Yet despite the long recognized potential of the video information storage and retrieval technique and its many practical advantages, its potential has not been realized, except in very limited and specialized applications. While a few systems based on this technique are in current use, the system cost is almost prohibitive and has militated against the widespread acceptance of the video approach.

In order to explain why present day video filing systems are exceptionally expensive, we shall first briefly describe one of those systems. In one known type of video filing system, paper documents are converted by a high-resolution video camera into corresponding high-resolution video image signals. These video signals, together with identifying addresses are automatically filed and stored in compact form on magnetic tape reels. Any individual document page can automatically be retrieved, looked at in its original size, purged, reorganized with other images or instantly moved to various locations.

An image of a recalled document is presented for viewing on a television screen or reproduced from the screen as a hard copy. Since the document images are electronic in nature, filing and retrieval can be carried out remotely from a central file.

The crucial cost factor in a video filing system of the known type lies in its means to store the documents as compact video images on magnetic tape which, when played back, are as readable as the original documents. The fact that modern commercial television systems afford clear images does not signify that such systems can be used successfully for document storage and retrieval, for there is a vast difference between being able to read on a T-V screen an 8 ½ × 11 inch document having more than a thousand characters printed on the page, and being able to see on the screen a picture of a house, for in the latter instance, gross detail is sufficient to give one a clear impression of a house, whereas in the former, small printed characters cannot be deciphered.

It is for this reason that a video filing system must employ high-resolution video means for recording and displaying documents. An electronic image of a document is created by scanning an optical image of the document focused on the photo-sensitive surface of the video camera tube. Scanning is effected by sweeping an electron beam across the tube surface, each sweep being a scan line. By the time the beam has sequentially scanned across the entire picture area from top to bottom, it has created an electronic image of the original document to complete an image frame.

The number of scan lines in an image frame determines its resolution or readability. Resolution is a measure of how readable a document is when retrieved from the video picture. Commercial television in the United States has an established standard of 525 scan lines per frame. The resultant resolution is altogether inadequate for normal printed matter. Hence, in the above-described video filing system, use is made of a high-resolution camera and a display tube having 1,280 scan lines in each frame.

With a high-resolution system of the known type, the magnetic tape storage components and all other functioning elements of the system are designed to operate with the high-resolution scan line number. As a consequence of this requirement, use cannot be made of commercially-available video recording components designed to operate with the standard 525 scan line number per frame.

Another drawback of the known system which discourages its adoption, is that when video signals from the storage bank are to be transmitted over common video carrier lines to a remote user terminal, one cannot use standard T-V transmission facilities for this purpose, for such facilities are incapable of conveying the frequencies of a high-resolution video signal. For example, even if a common video carrier line is capable of carrying a 7 megacycle high-resolution video signal as well as the standard 4 megacycle video signal, the associated synchronization system which is designed for the existing standard will not function with the high-resolution signal. Hence, special carrier lines are called for, and this fact adds considerably to installation and operating costs.

The practical consequences of these restrictions are serious, for while standard components are mass-resolution recording equipment is not an off-the-shelf item, it must be custom-manufactured and it is inevitably far more expensive than standard equipment.

For example, when equipment is intended for a mass market, solid state microelectronic techniques may be used to reduce production costs and to afford more compact equipment without sacrificing quality, whereas it is not feasible to use microelectronic devices for a handful of custom-made video filing installations of the known type.

U.S. Pat. Nos. 3,594,729 and 3,514,537 disclose video systems for recording data on magnetic tape and for the selective retrieval of the recorded data. These patents and the patents cited therein are relied on for a disclosure of known types of T-V components, such as T-V cameras, display tubes and related equipment.

SUMMARY OF THE INVENTION

In view of the foregoing, the main object of this invention is to provide a hybrid high-resolution/low-resolution video information storage and retrieval system which, though of relatively modest cost, operates with a high degree of reliability and efficiency. Because of substantial cost reduction effected by the present invention, the system lies in a reasonable price range that promotes its widespread adoption.

A significant advantage of the invention is that the stored signals may be played back and transmitted over existing common carrier lines designed for standard low-resolution signals, to be picked up and reproduced on a high-resolution T-V display tube.

More particularly, it is an object of the invention to provide a filing system employing a high-resolution video camera and T-V display tubes to convert documents into video signals and to reproduce the documents so that they are clearly readable, the camera and display tubes operating in conjunction with standard low-resolution magnetic tape recording apparatus for storing the images picked up by the camera and for playing back the images for presentation by the tubes.

Yet another object of the invention is to provide a buffer for reconciling the operation of the high-resolution with the low-resolution components of the hybrid system whereby the advantages of high-resolution operation are gained in a manner compatible with low-resolution transmission standards.

Briefly stated, these objects are attained in a video-filing system in which the camera tube for converting the documents into video signals and the video display tube on whose screen the stored documents are reproduced, both function as high-resolution devices with a scan line number per frame that is a predetermined multiple of the standard T-V low resolution number and with a frame repetition rate that is a complementary sub-multiple of the standard rate.

The video signals generated by the camera are stored in a standard low-resolution magnetic storage device. In order to reconcile this low-resolution apparatus with the high-resolution camera and with the high-resolution display tube, a buffer is provided that functions to divide the video signal representing a single image frame into signal sections, each having a scan line number equal to the standard line number per frame within a time period equal to the full frame period of the standard frame repetition rate.

Each signal section is recorded in sequence in the buffer on a separate continuous track. In the storage mode, the signal sections which together represent a full high-resolution frame, are transferred sequentially from the buffer to the magnetic tape of the storage device to be stored permanently thereon. In the playback mode, the recorded signal sections on the tape are transferred back to the buffer and from the buffer the sections are fed to the display tube for high-resolution presentation. The magnetic tape is provided with the usual track for addressing the frames recorded thereon to facilitate automatic retrieval.

OUTLINE OF THE DRAWINGS

For a better understanding of the invention as well as other objects and further features thereof, reference is made to the following detailed description to be read in conjunction with the accompanying drawings, wherein.

DESCRIPTION OF THE INVENTION

Figures 1, 2:
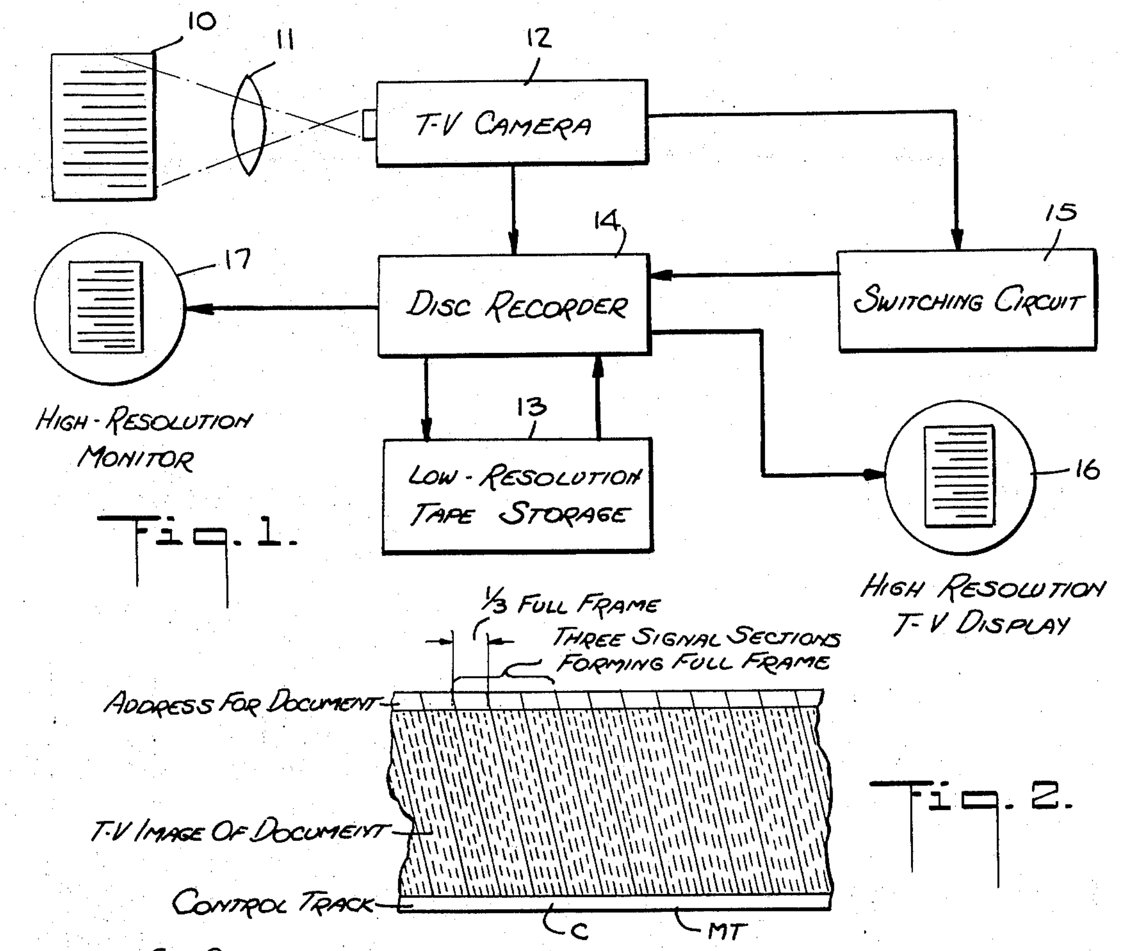
FIG. 1 is a block diagram showing in simplified form, a video filing system according to the invention.
FIG. 2 is a schematic diagram of the magnetic recording tape.

Since the present invention seeks to exploit, in the context of a video filing system, the availability of standard mass-produced video recording and read-out components and to make use of standard T-V coaxial lines for transmission, we shall briefly consider the T-V standard which prevails in the United States and the reasons therefor.

A television camera tube employs an electron scanning beam to read off variations of signal amplitudes, corresponding to brightness, from a photo-sensitive surface upon which a picture image is focused. This image is recreated by a cathode-ray display tube when a corresponding, synchronously-modulated and deflected electron beam impinges upon the phosphorescent screen surface of the tube.

In a conventional television broadcast system, the video signals that are generated by the camera and transmitted are intercepted by a receiver for immediate display on the cathode ray tube screen. But in a video filing system, the video signals from the camera which views the documents to be stored, are permanently recorded on magnetic tape and are held in storage thereon until a demand is made to see the document, at which time the tape is played back to reproduce the stored video signals which are applied to the T-V display tube for screen presentation.

The method of analyzing and synthesizing visual images employed in modern T-V systems is known as linear scanning. This involves the exploration of the image by an elemental spot, designated the scanning agent, which traverses the area of the image in a series of horizontal lines, moving over every point in the image at a constant speed and sensing the degree of brightness at each point in succession.

The camera tube, which includes the scanning agent, generates a succession of electrical impulses (the video signal) which correspond to the successive values of brightness sensed by the beam. At the T-V receiver, the scanning process entails setting up an elemental luminous spot which moves synchronously with the scanning agent in the camera tube. The brightness of the spot is controlled by the video signal derived from the camera tube, whereby the values of brightness present in the original image are reproduced on the T-V screen in their proper positions.

The scanning process must be rapid enough so that all elements of the reproduced image are perceived simultaneously by the eye. This requirement is satisfied if scanning is completed within the duration of the visual persistence of the human eye.

The total number of lines over which the scanning agent passes from the beginning of one complete image to the beginning of the next is known as the total number of lines per frame. This scan line number determines the degree of detail which may be accommodated in the reproduced image on the vertical dimension and it sets the limit on the resolution of the system. In modern T-V systems, this number, in various countries, lies in a range between 400 and 700 lines. Under the established United States standard, the number of scan lines per frame is 525.

To reduce flicker in the reproduced image, interlaced scanning is customarily employed whereby the image is scanned in two groups of lines. The interlaced scanning motion is on a two field, odd-line basis wherein the scanning agent traverses the area in two series of lines, alternately. One set of the two sets of lines in the interlaced pattern is known as the interlaced field. Since the total number of lines in the complete frame is an odd number (525) the number of lines per field is 262 ½. The scanning agent is made to traverse the picture area in the interlaced pattern by imparting to it horizontal and vertical motions so that as the spot is displaced horizontally from left to right, it is simultaneously displaced downwardly.

The vertical resolution of the scanning pattern is measured by the number of pictorial details or picture elements that may be accommodated in the vertical height of the picture area. Each active scanning line is capable of reproducing one such picture element in the vertical direction, but since the picture element in the image may not fall directly on the scanning line, the actual number of picture elements which may be accommodated vertically is less than the number of active scanning lines.

The horizontal resolution of the scanning pattern is measured by the number of picture elements that may be accomodated in the horizontal direction measured in a width equal to the picture height. The picture height is used as a basis for making the horizontal resolution directly complementary to the vertical resolution.

The frame repetition rate, in a television system for moving images, depends on the duration of the persistence of vision and also upon the necessity of reproducing motion in the image in a smooth manner. In motion pictures, the standard rate is 24 frames per second, with each frame projected twice, making 48 projection intervals per second. But in a television system, while similar values apply, it is desirable to use a frame repetition rate which is an exact sub-multiple of the standard 60 cycle a-c power supply frequency. Hence, the standard U.S. frame repetition rate is 30 per second (or a field repetition rate of 60 per second).

In a video filing system, the concern is with static, not moving images. Consequently there is no need for a high frame rate that reproduces motion in a smooth manner. But the frame rate must be such as to provide a stationary image free of flicker. The human eye is able to discriminate between successive showings of the same image if the rate is slow and below the minimum rate of visual persistence. Hence a presentation of ten frames per second will give rise to perceptible flicker.

In order to read a page of printed material, typically made up of characters 0.0625 inches high, a high resolution T-V system having well over 1,000 active scanning lines is required — the more active lines, the better the resolution. This requirement is not met by a standard television system having 525 lines per frame, particularly since with a system of this type less than 500 lines are actually active. In interlaced scanning, the scanning agent is only active in discovering picture information when moving down the surface and it is not active during the upward trace. Thus a video file information for storing and presenting documents requires a much higher resolution than a standard T-V system to afford readability.

A high-resolution T-V camera and T-V receiver are not significantly more expensive than standard low-resolution equipment, for the differences therebetween lie mainly in the fact that the latter provides a higher line number than the former. But magnetic tape recording apparatus for recording and storing high-resolution video signals are far more difficult to construct and are considerably more expensive than those designed for standard low-resolution signals.

The reason for this difference lies in bandwidth requirements, for the higher the bandwidth of the video signals to be recorded, the more difficult it is to make magnetic tape recordings of acceptable fidelity.

The bandwidth requirement is determined by the maximum video frequency generated by the television camera. This frequency is directly proportional to the rate at which the picture elements are scanned along each line. Obviously, when a frame is composed, say of 240 scanning lines, with 24 frames repeated per second, the picture elements are then scanned at a much slower rate than in a standard system in which the frame is composed of 525 lines, with 30 frame produced per second.

As indicated in the Radio Engineering Handbook of Henney — Fifth Ed. — McGraw-Hill (section 22-7), the maximum video frequency for equal vertical and horizontal resolutions, with a frame of 240 scanning lines, 24 frames per second, is 727,000 $H_z$, whereas with a standard 525 line-30 frames per second system, the maximum video frequency is 4,350,000 $H_z$.

Thus, recording equipment for standard video signals must be capable of recording frequencies in excess of 4 million $H_z$. But if, as indicated in the same Handbook, the number of scanning lines per frame is 1,029 at 30 frames per second (high-resolution), then the maximum video frequency steps up sharply to 16,650,000 $H_z$.

It is extremely difficult to faithfully record frequencies as high as 16 million $H_z$. Yet, in known video filing systems which make use of high-resolution cameras and display tubes, with a number of scan lines per frame well above 1,000, it becomes necessary to record extremely high frequencies. As a consequence, these specialized recording requirements give rise to high costs, which put the systems out of reach for most potential users.

In the present invention, as will now be explained, the camera and T-V display tubes are high-resolution devices in order to realize acceptable readability, whereas the recording and readout equipment are low-resolution devices operating under existing standards, the low-resolution equipment being made fully compatible with the high-resolution devices by means of a buffer, to be hereinafter described. We shall now consider the basic components of a hybrid video filing system in accordance with the invention.

Referring now to FIG. 1, there is shown in simplified form, the basic components of a video filing system for filing, storing and retrieving information. The information, represented by a printed document 10, is placed on an illuminated platen. An optical image thereof is focused by a suitable lens assembly 11 onto the photosensitive surface of a high-resolution T-V camera tube 12. In the camera tube, an electron beam sweeps across the photosensitive surface to generate a video signal representing the varying brightness of the picture elements constituting the document image.

The high-resolution video camera, which may be a Singer Company GPL-1000 or a Riker-Maxson Corp. TC 177, is adapted to function with a scan line number per frame which is a predetermined integral multiple of the standard line number and with a frame repetition rate which is a complementary sub-multiple of the standard repetition rate.

For example, a preferred high-resolution frame line number is 1,575 which is three times the standard 525 line number, in which event the sub-multiple is 10 frames per second, which is one-third standard frame repetition rate of 30 frames per second. In other words, if the standard scan line number is multiplied by a factor of three, the frame rate is divided by the same factor.

It is to be understood however that the multiple-sub-multiple relationship between the standard T-V values and the high-resolution T-V values need not be 3 : as given above, but may be higher, such as 4 : ¼ or 5 : 1/5. Though one could also use a 2 : ½ relationship, the resultant resolution is not too satisfactory for good readability with printed matter of small type size.

Hence the output of video camera 12 viewing the document yields a high-resolution video signal. This video signal is recorded using standard low-resolution magnetic tape recording equipment adapted to operate at the usual standard (525 lines per frame — 30 frames per second). In order to make possible such low cost recording, the video signal from the camera representing a single frame, is temporarily recorded and stored in a buffer which includes a disc type recorder 14 whose operation is controlled by a switching circuit 15.

The buffer is adapted to accept the 1,575 line per frame video signal (10 frames per second) from the camera and to divide this signal equally among three parallel continuous tracks on disc recorder 14, whereby the first 525 lines of the full frame, which appear during a one-thirtieth of a second interval, go to the first continuous track, the second 525 lines, which appear in the next one-thirtieth of a second, go to the second continuous track, and the final 525 lines of the same frame, which appear in the last one-thirtieth of a second, go to the third continuous track. Thus the high-resolution video signal is divided into three equal signal sections each of which has the standard scan line number and frame repetition ratio. However each section represents only one-third of the total high-resolution frame.

While one may use a disc to provide continuous recording tracks, such tracks are also obtainable in tape loops or with recording drums. In playback, the disc or other continuous track device is continuously rotated to repeat the image frames to provide a stationary image on the T-V screen for as long as the user requires the image.

With a low-resolution disc recorder in which in the course of a full disc revolution taking place in one-thirtieth of a second, a recording of a single high-resolution frame from the video camera takes place sequentially on three tracks in the course of three revolutions. Thus, a full high-resolution frame composed of three signal sections, is recorded in one-tenth of a second. The disc recorder may therefore be a conventional mass-produced type having a motor synchronized with the 60 cycle power-line, for the rate of rotation of the disc motor is an integral multiple of the power frequency.

If one were to play back any one continuous track on the disc on a standard T-V display tube, one would see only a third of the original document, which would appear at the standard 525 line — 30 frame per second rate. In order therefore to reconstruct the document, all three tracks must be played back in sequence.

In practice, the buffer disc recorder may be provided with a unitary assembly of three recording heads, each associated with one of the three tracks in a disc having a large number of concentric tracks. The switching circuit 15, which is controlled by the T-V camera 11, acts to render the first head operative for the first signal section of 525 lines, the second head is rendered operative for the next 525 lines and the third head for the final 525 lines.

Thus the three continuous tracks on the disc are recorded in sequence. When another document is to be recorded, the tri-head assembly is automatically mechanically indexed to the next set of three tracks on the disc. In practice, instead of a tri-head assembly which requires mechanical indexing, one may have as many stationary heads as one has continuous tracks on the disc, in which event electronic commutation is employed to render the heads operative in proper sequence. By electronically switching the recording heads during horizontal blanking, no visible evidence of the division of the frame will be discernable in the high-resolution image. Since the buffer serves only for temporary storage, means are provided to erase the records after the buffer has performed its required function.

In practice, each document to be stored is scanned twice, the first scan serving for test purposes to determine the proper contrast ratio and to adjust the gain of the internal amplifier of the camera so as to sharpen the contrast, the second scan being for recording purposes.

Now that the document frame appears in a set of three continuous tracks on buffer disc 14, it may be transferred to the magnetic tape recorder 13 which is in the standard format. The tape recorder may, for example, be of the helical scan transverse recording type (Model IVC-800) produced by the international Video Corp. and described in Broadcast Management Engineering, March 1968, the recorder being capable of recording video signals with a 4.2 mHz bandwidth with excellent signal-to-noise ratio.

As shown in FIG. 2, the magnetic tape MT has stored thereon a series of nearly perpendicular tracks. These transverse tracks are shown by dashed lines. The solid transverse lines S indicate the frame sections, each set of three sections constituting a full frame representing a high-resolution recording of a document.

The tape is also provided with a longitudinally-extending audio "address" track A along one edge for identifying the recorded frame, and a control track C along the opposing edge for accurate positioning of the tape. Document image tracks are made by rapidly rotating transverse recording heads, whereas the address and control tracks are made by stationary heads.

In the playback mode, when one wishes to retrieve a particular document, the three signal sections recorded on the storage tape, which together represent the document, are first located by means of the address, and the selected three sections are then transferred to three continuous tracks on the buffer disc. From the disc, the three tracks are played back in sequence continuously to produce a high-resolution video signal (1,575 lines — 10 frames per second) which is applied to a high-resolution T-V display tube 16.

The high-resolution signals from the buffer disc, during the filing procedure, are applied to a monitor video display tube 17 so that one may check or preview the video image representing the document, before these video signals are placed in storage.

Thus the function of the buffer, in the storage mode, is to convert the high-resolution signals representing a document frame, into signal sections suitable for storage in a standard low-resolution recording device, and in the playback mode to reconstitute the signal sections taken out of storage, into a high-resolution signal suitable for display.

Figure 3:
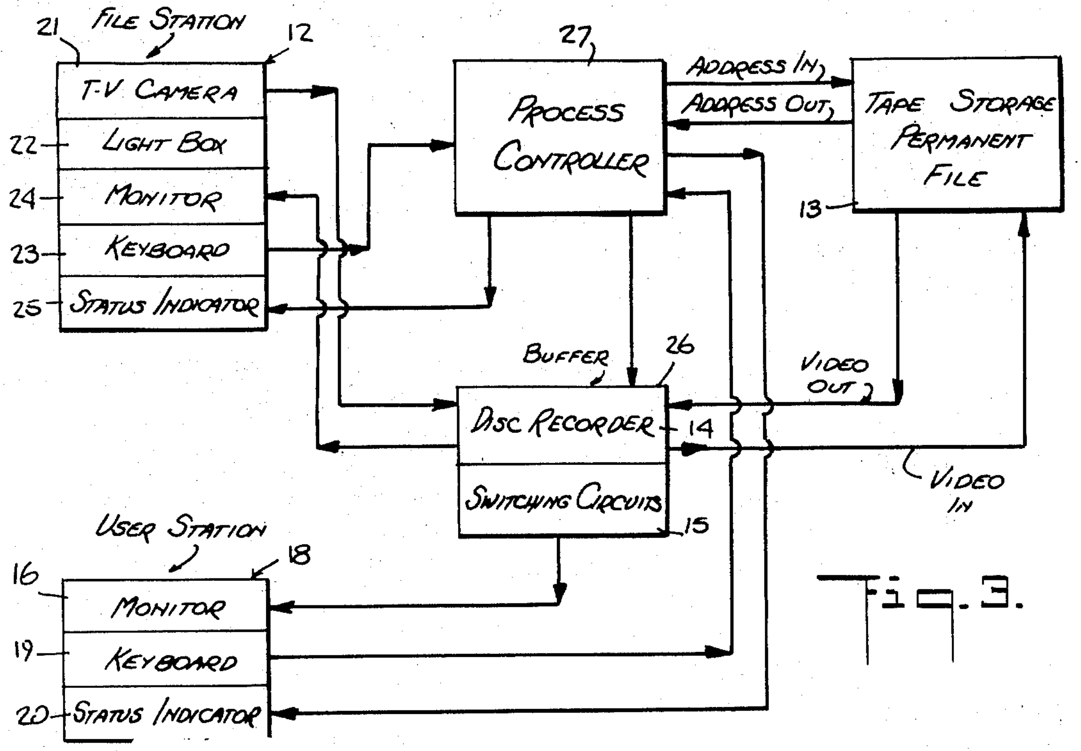
FIG. 3 is a more detailed block diagram of the system.

Referring now to FIG. 3, we shall consider in greater detail, a practical form of the system shown in simplified form in FIG. 1. The arrangement in FIG. 3 includes various features which are preferably incorporated in an actual system.

First we shall consider the user station, generally designated by numeral 18. In practice, a video filing system may have several such stations which may be local or placed at remote points which are linked by carrier cable to the central installation. Each user station is provided with a T-V display tube 16 as well as a keyboard 19 and a status indicator 20.

The high-resolution display tube 16 presents the selected document on a T-V screen in readable form. Keyboard 19 may be in the form of a ten-key push-button panel, making it possible for the user to request a document by number or other symbols. Status indicator 20 indicates the mode of operation in effect, i.e., (A) document being requested, (B) request document, (C) control file busy, (D) document is in storage bank, (E) document is not in storage bank, (F) incorrect request.

Status (A) indicates that the request processor is filling the order. Status (B) indicates that the system is available for operation. Status (C) notes that the central file is busy and hence not available for operation. Status (D) indicates that the document is available for use. Status (E) tells one that the document corresponding to the requested number has been purged from the file or that no document was ever assigned that number, or that the particular document is prohibited to this user station. Status (F) simply means that the requested number violates the system logic. In practice, the number of the requested document may be shown on the user console as a series of illuminated numerals.

The filing station, generally designated by numeral 21, has the same basic elements as a user station plus the video camera 12 which operates in conjunction with a suitable light box 22. Light box 22 functions to illuminate the document placed by the operator on the platen. The box furnishes high-intensity uniform illumination to ensure an optimum signal-to-noise ratio and good contrast.

Keyboard 23 at the filing station functions to encode a retrieval number or address with the image of the document being field. After the operator places the document on the platen and enters the address on the keyboard, the document is electronically filed. The T-V display tube 24 serves as a monitor to preview the document before filing. The status indicator 25, at the filing station, as in the case of the indicator at the user station, advises the operator of the existing condition of the system.

In practice, keyboard 23 at the filing station may have both alpha and numeric character keys plus various control keys for initiating the required system functions. After the operator has electronically filed the document, the filing action is then complete. No further processing or development of the document is necessary, as is the case with film or microfilm systems.

The buffer station, generally designated by numeral 26, is constituted by the multi-track recording and playback disc 14 and its associated switching circuit 15 to effect sequential switching of the video signal sections. This unit serves for temporary image storage to interface between the high-resolution viewing function carried out by video camera 12 and the low-resolution standard for the central storage. This unit also acts to refresh the image on the viewing surface so as to avoid flicker, to ensure sufficient brightness for easy reading, and to store a series of documents for current use.

As noted previously, the cathode ray video display tubes operate with a high-resolution scan number (i.e., 1,575 lines per frame) and with a frame repetition rate (10) which is low relative to the standard rate (30). But since we are dealing with stationary images, flicker can be avoided simply by using a cathode ray tube incorporating a phosphor screen having a square wave decay characteristic which has a prolonged persistence that acts to suppress a 10 cps flicker. While this type of persistent phosphor is unacceptable for moving images, it is feasible with stationary document images.

Alternatively, one may use a cathode chromic display that can be stored for a prolonged period. Or one can increase the disc speed by a factor of 3 (in the case where the sub-multiple of the standard repetition rate is one-third) to produce an effective 30 cps frame rate. The use of this option requires an initial reduction in disc speed so that both extremes of the rotational velocity are mechanically feasible (1,200 rpm for recording from the tape — 3,600 rpm for display).

Thus, buffer station 26 functions (a) to accept video inputs from the filing station or the general permanent storage station, (b) it stores and transmits, on command, the video signal temporarily stored on the disc to a user station, (c) it refreshes the signal at a 30 cps rate to obviate flicker, (d) it transmits the video signal, on command, to the general file for permanent storage, (e) it reformats the signal so that the high-resolution camera image can be stored on a standard video magnetic tape, and (f) it also supplies sync signals to the local stations.

The storage capacity of the buffer unit (depending on the number of continuous tracks on the disc) can be as great as 200 pages of data. Thus, one buffer station, with suitable request processors interfaced therewith, may service a great many user stations.

The general file storage station is the central depository or bank for document storage. The station is constituted by the tape recorder- tape playback units 13 and a request processor 27 which operates in conjunction with a suitable interconnect module for communication with local user stations or remote stations via common carrier. The general file storage station operates at the established low-resolution video standards of 525 scan lines per frame — 30 frames per second. Hence standard, commercially-available magnetic tape recorders may be used in the storage station.

The general file storage station stores documents on a frame-by-frame basis and allows for image retrieval by inserting the digital document address of each image on the audio track of the magnetic tape. The input to the storage station are video and sync signals from buffer station 26 and control commands from the request processor 27. The outputs from the storage station are video and sync signals to buffer station 26 and digital responses to the request processor 27. These responses are file busy (active), file available (open), incorrect document number (void), i.e., document slot empty or user not permitted to see document.

The request processor 27 is, in practice, a minicomputer that serves as the interface between (a) all user stations and the buffer station 26, (b) the buffer station and the general storage files, (c) the filing station and the buffer station. The inputs of the request processor are all document requests for validation and action. Its outputs are all system timing signals, document numbers for filing, system status signals and video switching codes.

We shall now briefly review the operation of the video filing system.

Document Storage: a document is filed by placing it before the video camera 12 which, on command, scans the document to produce a high-resolution (1,575 scan line — 10 frames per second) video signal which is temporarily stored in three video signals sections (each having 525 lines per second) on the buffer disc, the signal sections on the buffer disc then being read out for display verification on the filing station monitor display tube 24.

Now the three signal sections from the buffer disc are transferred to video tape in the general storage station 13. The control procedure for this purpose is as follows:

a. The filing station operator waits for a ready-to-file light (open) on the station indicator 25 of the file station console.

b. The document file number or address is entered on the keyboard 23 of the file station console and appears on an illuminated readout during the time the document is being scanned.

c. The document address is stored on the buffer disc and also in the request processor 27.

d. The verification command retransmits the document file number to the disc via the request processor.

e. The request processor 27 compares the disc storage number with the file number and allows the proper disc track set to be read out for display and verification.

f. After verification approval is signalled to the request processor, the disc image is transferred to a free area of the general storage file as soon as the system permits this operation.

Document Retrieval: At the user station, the required document number (or series of numbers, if several documents are requested) are entered by the user on the keyboard 19. The request processor 17 verifies that the number is valid, that the slot has a document in it, and that the document is permitted to the requesting station.

If all answers are positive, the processor commands the tape transport to deliver the document to the buffer station. The transport audio head reads, at high speed, the document number to the processor which compares it to the requested number. As the desired document is approached, the processor commands the tape transport to reduce its speed from fast forward or reverse to video "read," and when the document number difference is zero, the video is switched to the disc. The request processor then goes on to the next document number or stops the transport.

The document on the buffer station is then sent from the processor to the user station. There the document can be displayed immediately or when the user is ready. Until the user voids a request, the document remains in the buffer disc. At the user station a printer section may be installed to make hard copies of the retrieved document.

A hybrid high-resolution/low resolution video filing system in accordance with the present invention primarily differs from an existing high-resolution system such as the "Videofile" Information System manufactured by Ampex Corporation, Videofile Information Systems Division (Sunnyvale, Calif.) in that in the present invention the high-resolution video signals produced by the video camera viewing the documents and the high-resolution video signals applied to the T-V display device, operate with a scan number per frame that is a predetermined multiple of the standard number, and with a frame repetition rate that is a complementary sub-multiple of the standard rate, so that for low-resolution recording and storage purposes, the high-resolution signals may be divided into video signal sections each of which has the standard scan line number and frame rate.

Inasmuch as many of the components used by a system according to the present invention are similar to those in a "Videofile" information system, a disclosure as to the details of these components may be found in patents relating to the "Videofile" system, including U.S. Pat. Nos. 3,340,367, 3,414,683, 3,463,877 and 3,571,527.

The system disclosed herein does not, in practice, lend itself to the filing of video signals derived from colored documents unless, of course, these documents are scanned and reproduced by black and white high-resolution cameras and display tubes operating with black and white video signals. But if a high-resolution color T-V camera is used to view the document to produce color video signals, high-resolution cathode ray display tubes for color presentation are not presently commercially available for reproduction of these color signals. However, when dealing with colored documents to be stored and later retrieved, one may separate the colored information, such as pictures, from the accompanying text to produce two documents which may be stored and read-out by a system in accordance with the invention.

For example, a page of a color printed catalog can be converted into two documents, one containing the colored illustrations on the page and the second the printed text. The text document can be filed and processed by the higher-resolution/low-resolution system, as previously described. The color document can be filed by using a standard color T-V camera, but the color video signal from the camera,which is composed of blue, red and green components, is filed by recording these components on three separate tracks or the buffer disc. These video components temporarily recorded on the disc are then transferred to the same storage tape storing the three signal sections of the black and white text. In play-back, the three color component signal sections are played back simultaneously to recreate the image of the color picture, whereas the three black and white signal sections are played back sequentially to recreate the printed text.

In the case of color image storage, since the buffer disc has a capacity of 200 or more tracks, one may temporarily store on this disc a sequence of say 60 frames of a moving color image (each frame having three color components) and in play back produced a short movie presentation.

While there has been shown and described a preferred embodiment of a video information storage and retrieval system in accordance with the invention, it will be appreciated that many changes and modifications may be made therein, without, however, departing from the essential spirit thereof.

I claim:

1. The method of storing and retrieving documentary information comprising the steps of:

A. converting each document to be stored into a high-resolution input video signal representing a single frame whose scan number is over 1,000 and is a predetermined multiple of an established television standard within a time period equal to the period of a frame repetition rate which is a complementary sub-multiple of the standard;

B. dividing said input video signal into equal signal sections, each of which has a scan number equal to said standard number within a time period equal to the period of said standard rate;

C. temporarily recording each of said signal sections sequentially on separate continuous tracks;

D. in the storage mode, transferring said signal sections sequentially from said tracks to a low-resolution standard recording medium to provide permanent storage therefor;

E. in the retrieval mode, playing back said signal sections from said medium onto said continuous tracks;

F. playing said continuous tracks containing said played back sections to reconstitute said input high-resolution video signal and repeating said play to produce a high-resolution output video signal capable of creating a sustained image; and G. applying said high-resolution output video signal to a high-resolution display device for retrieving said stored document.

2. A video information and storage system comprising:

A. high-resolution means for scanning a document to be filed to produce an input video signal representing a single frame whose scan number is over 1000 and is a predetermined multiple of an established television standard within a time period equal to the period of a frame repetition rate which is a complementary sub-multiple of the standard;

B. a high-resolution video display responsive to said video signal to present a video image of said document, said display operating at a scan number per frame which is the same predetermined multiple of an established standard low-resolution scan number and at a frame repetition rate which is a complementary sub-multiple of the standard rate;

C. a buffer responsive to said input video signal for dividing the signal into equal signal sections, each having a scan line number equal to said standard number within a time period equal to the period of said standard repetition rate, said buffer temporarily recording said signal sections on separate continuous tracks;

D. low-resolution magnetic tape storage apparatus adapted permanently to store standard video signals; and E. a process controller which is operative in the storage mode to effect transfer of said signal sections from said buffer to said storage apparatus whereby said signal sections which have a standard scan line number and frame rate are recorded as a set at an assigned tape position, and which is operative in the play-back mode to transfer said set of signal sections to said buffer, from which the signal sections are played back to reconstitute the input high-resolution video signal representing a single frame, said playback being repeated to produce a high-resolution output video signal capable of creating a sustained image, which output signal is applied to said display tube.

3. The system as set forth in claim 2, wherein said established standard has a scan line number of 525 and a frame repetition rate of 30 per second.

4. A system as set forth in claim 3, wherein said predetermined multiple is 3 and said sub-multiple is ⅓.

5. A system as set forth in claim 3, wherein said predetermined multiple is 4 and said sub-multiple is ¼.

6. A system as set forth in claim 1, wherein said scanning means is a video camera.

7. A system as set forth in claim 1, wherein said display tube has a long persistence phosphor screen to minimize flicker.

8. A system as set forth in claim 1, wherein said buffer includes a magnetic disc record having concentric tracks.

9. A system as set forth in claim 8, further including a group of recording heads equal in number to the number of signal sections for recording said sections on a selected set of parallel continuous tracks.

10. A system as set forth in claim 9, further including means to index said group of heads to another set of parallel tracks.

11. A system as set forth in claim 1, wherein said magnetic tape includes an audio track along one edge thereof, and a transverse recording track for said signal sections and means to record on said audio track addresses related to said recorded signal sections.

12. A system as set forth in claim 11, wherein said document is viewed at a filing station provided with a keyboard for entering said addresses.

13. A system as set forth in claim 12, wherein said filing station includes a monitor display device responsive to said high-resolution signal produced by said buffer to preview the information to be stored.

14. A system as set forth in claim 1, wherein said retrieved document is viewed at a user station having a keyboard for requesting a document from storage by its address.

15. The method of transmitting a document by means of a video line adapted to convey video signals whose scan number per frame and whose frame repetition rate comply with an established standard, said method comprising the steps of:

A. converting the document into a high-resolution input video signal representing a single frame whose scan number is over 1,000 and is a predetermined multiple of said established television standard within a time period equal to the period of a frame repetition rate which is a complementary sub-multiple of the standard;

B. dividing said input video signal into equal signal sections, each of which has a scan number equal to said standard number within a time period equal to the period of the standard rate;

C. feeding said signal sections sequentially into said line for conveyance to a remote station at which each signal section is recorded on a separate continuous track;

D. playing back said continuous track recordings sequentially to reconstitute said input high-resolution video signal representing said signal frame, and repeating said play back to produce a high-resolution output video signal capable of creating a sustained image; and E. applying said high-resolution output video signal to a high-resolution display device to reproduce said document.

* * * * *

UNITED STATES PATENT OFFICE
CERTIFICATE OF CORRECTION

Patent No. 3,803,352 Dated April 9, 1974

Inventor(s) Arnold Goldberger

It is certified that error appears in the above-identified patent and that said Letters Patent are hereby corrected as shown below:

The Assignee: "Video Fox" should have read -- VideoFax--
In the Abstract, line 13 of 2nd column "divided" should have read -- divide --
line 19 of 2nd column "or" should have read -- on --
Column 2, line 30 "video picture." should have read -- video filing system; it is the amount of resolvable detail in the video picture. --
Column 2, lines 61 and 62 "mass-resolution" should have read -- mass-produced and can be purchased at a relatively modest cost, high-resolution --
Column 6, line 38 "frame" 2nd occurrence, should have read -- frames --
Column 7, line 34 "3 : as" should have read -- 3 : 1/3 as --
Column 10, line 13 "field" should have read -- filed --
Column 11, line 47 "signals" should have read -- signal --
Column 14, Claim 3, first line "The" should have read -- A --
Column 16, line 13 "signal" 2nd occurrence should have read -- single --

Signed and sealed this 17th day of September 1974.

(SEAL)
Attest:

McCOY M. GIBSON JR.
Attesting Officer

C. MARSHALL DANN
Commissioner of Patents

UNITED STATES PATENT OFFICE

CERTIFICATE OF CORRECTION

Patent No. 3,803,352 Dated October 15, 1974

Inventor(s) Arnold Goldberger

It is certified that error appears in the above-identified patent and that said Letters Patent are hereby corrected as shown below:

Claim 6, line 1 "claim 1" should have read -- claim 2 --
Claim 7, line 1 "claim 1" should have read -- claim 2 --
Claim 8, line 1 "claim 1" should have read -- claim 2 --
Claim 11, line 1 "claim 1" should have read -- claim 2 --

Claim 14, line 1 "claim 1" should have read -- claim 2 --

Signed and sealed this 7th day of January 1975.

(SEAL)
Attest:

McCOY M. GIBSON JR.
Attesting Officer

C. MARSHALL DANN
Commissioner of Patents